United States Patent [19]

Gearhart

[11] Patent Number: 4,694,166
[45] Date of Patent: Sep. 15, 1987

[54] LOGGING DEVICE HAVING BIMETALLIC INSULATING FLASK

[75] Inventor: Dale A. Gearhart, Fort Worth, Tex.

[73] Assignee: Gearhart Industries, Inc., Fort Worth, Tex.

[21] Appl. No.: 738,419

[22] Filed: May 28, 1985

[51] Int. Cl.$^4$ .............................................. G01V 5/04
[52] U.S. Cl. ..................................... 250/261; 250/269
[58] Field of Search .................... 250/261, 370 L, 352, 250/269; 220/420

[56] References Cited

U.S. PATENT DOCUMENTS

| | | | |
|---|---|---|---|
| 4,109,522 | 8/1978 | Thompson | 250/261 |
| 4,200,199 | 4/1980 | Perkins et al. | 220/420 |
| 4,399,919 | 8/1983 | Posnansky et al. | 220/420 |
| 4,568,830 | 2/1986 | Stromswold et al. | 250/261 |

OTHER PUBLICATIONS

"McGraw-Hill Dictionary of Scientific and Technical Terms", 2nd ed., McGraw-Hill, Inc., New York, 1978, p. 916.

Primary Examiner—Carolyn E. Fields
Attorney, Agent, or Firm—Hubbard, Thurman, Turner & Tucker

[57] ABSTRACT

A logging device is disclosed for utilization in the detection of low energy photons. The logging device includes a sonde suitable for insertion into a wellbore. An insulating storage vessel is disposed within the sonde and serves to insulate a photon detection device and its associated electronic circuitry. The insulating storage vessel is constructed utilizing an inner and outer cylindrical shell. Each shell is constructed utilizing a low thermal conductive metallic material such as stainless steel or titanium and each shell includes at least a portion constructed utilizing a low density material having a high photon transmission property wherein low energy photons may be detected by the photon detection device within the insulating storage vessel. In a preferred embodiment of the present invention, an aperture is provided in the sonde which includes a plug of low density, low atomic number material wherein low energy photons may penetrate the sonde.

12 Claims, 1 Drawing Figure

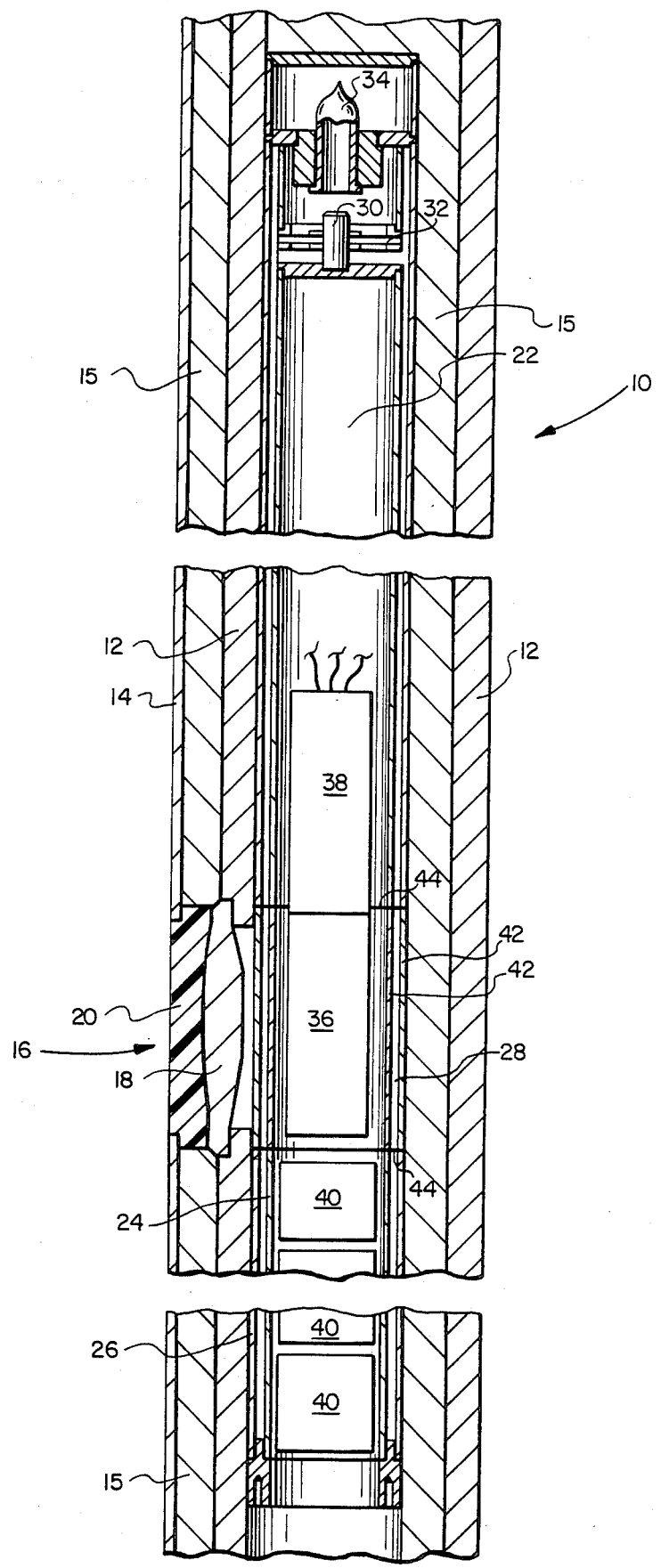

LOGGING DEVICE HAVING BIMETALLIC INSULATING FLASK

BACKGROUND OF THE INVENTION

This invention relates in general to wellbore logging devices and in particular to wellbore logging devices suitable for the detection of low energy photons. Still more particularly, this invention relates to logging devices suitable for the detection of low energy photons which include an insulating flask for providing thermal insulation for the enclosed photon detection circuit and which permit transmission of low energy photons.

Radioactivity well logging devices are well known in the prior art. Such devices are typically utilized to determine the bulk density and photoelectric cross-sectional index of an earth formation which is transversed by a wellbore. Logging devices for determining bulk density are typically based upon the principle of gamma-ray scattering. Present devices typically employ two independently spaced gamma-ray photon detectors in conjunction with a photon emitting source such as a Cesium 137 isotope. The detectors and source are housed in a pressure type vessel and are lowered into a wellbore where they are forced into contact with the wall of the wellbore. The sondes employed for this measurement are subjected to all of the environmental conditions present during the logging opeation which include elevated temperatures and pressures.

It is not uncommon for such logging devices to encounter temperatures approaching 400° Fahrenheit. At these elevated temperatures the accuracy of the tool measurement becomes increasingly influenced by degradation associated with such temperatures on the outputs of the photon detectors and the associated electronic circuitry. Additionally, continuous operation of the gamma-ray detection assembly at elevated temperatures may result in a shortening of the life span of such assemblies and may ultimately result in failure of the circuitry.

One method of protecting the temperature sensitive components of such a logging device is to house these components within an insulating storage vessel such as a Dewar flask. This is a well known practice and is typically utilized in the wellbore environment to retard heat flow from the environment into the heat sensitive components, thus permitting extended operation of the tool relative to a similar tool without an insulating storage vessel.

Construction of known Dewar flasks providing insulation for such logging tools typically utilizes materials having low thermal conductance such as stainless steel or titanium. However, it is equally important not to disrupt the broad range of scattered photon radiation which is incident to the loggin device's detectors. The scattered photon energy is utilized to describe the parameters of the earth formation surrounding the wellbore and must be measured with maximum possible accuracy in order to accurately determine those parameters. The utilization of known low thermal conductance materials such as titanium and stainless steel may shield or block low energy photons from reaching an insulated photon detector and may thus render the measurement of scattered photon radiation inaccurate. Thus, it should be evident that a need exists for a logging device which can operate successfully in a high temperature environment and which does not signifi- cantly disrupt the transmission of scattered gamma-ray photons.

SUMMARY OF THE INVENTION

It is therefore one object of the present invention to provide an improved radioactivity logging device.

It is another object of the present invention to provide an improved radioactivity logging device which includes means for thermally insulating a photon detection circuit.

It is still another object of the present invention to provide an improved radioactivity logging device which includes means for thermally insulating a photon detection circuit which permits a highlevel photon transmission.

It is yet another object of the present invention to provide an improved means for thermally insulating a photon detection circuit.

The foregoing objects are achieved as is now described. The logging device of the present invention includes a sonde suitable for insertion into a wellbore. An insulating storage vessel is disposed within the sonde and serves to insulate a photon detection device and its associated electronic circuitry. The insulating storage vessel is constructed utilizing an inner and outer cylindrical shell. Each shell is constructed utilizing a low thermal conductive metallic material such as stainless steel or titanium and each shell includes at least a portion constructed utilizing a low density material having a high photon transmission property wherein low energy photons may be detected by the photon detection device within the insulating storage vessel. In a preferred embodiment of the present invention, an aperture is provided in the sonde which includes a plug of low density, low atomic number material wherein low energy photons may penetrate the sonde.

BRIEF DESCRIPTION OF THE DRAWINGS

The novel features believed characteristic of the invention are set forth in the appended claims. The invention itself; however, as well as a preferred mode of use, further objects and advantages thereof, will best be understood by reference to the following detailed description of an illustrative embodiment when read in conjunction with the sole FIGURE wherein:

The sole FIGURE depicts a sectional and partially schematic view of the well logging device of the present invention.

DETAILED DESCRIPTION OF THE PREFERRED EMBODIMENT

Referring now to figures, there is depicted a sectional and partially schematic view of logging device 10 of the present invention. As can be seen, logging device 10 is contained within a sonde or pressure vessel 12 which is adapted to be inserted into a wellbore (not shown). Shield material 15 is provided as a photon shield to prevent eh passage of photons into detector 36 from regions in the formation not of interest to those we wish to measure. Commonly, a dense material, such a tungsten is used for such shield 15. As can be seen, shield material 15 is disposed outside sonde 12 on one side and inside sonde 12 on the other side. On the side of sonde 12 where shield material 15 is exposed, a highly durable material 14 is utilized to protect shield material 15. Preferably a layer of stainless steel approximately 0.060" is utilized.

Also depicted in the surface of sonde 12 is aperture 16 which preferably includes a plug 18 of a low density material having high photon transmission properties. In the preferred embodiment of the present invention, plug 18 is provided by utilizing beryllium and is preferably sealed against outside elements by utilizing a coating of epoxy 20. Aperture 16 is utilized to provide a pathway for low energy photons as will be explained in greater detail herein.

Disposed within sonde 12 of logging device 10 is insulating storage vessel 22. Insulating storage vessel 22 is constructed utilizing an inner cylindrical shell 24 and an outer cylindrical shell 26. As can be seen, outer cylindrical shell 26 is disposed around and spaced apart from inner cylindrical shell 24, wherein a space 28 is formed therebetween. Space 28 is preferably evacuated in order to enhance the insulative properties of storage vessel 22. Spacer 30 is utilized in conjunction with a spoked wheel support 32 to support inner cylindrical shell 24 and to maintain the relationship between inner cylindrical shell 24 and outer cylindrical shell 26. A pinch tube 34 is preferably utilized to evacuate space 28 and seal the vacuum created therein.

Disposed within storage vessel 22 is gamma-ray photon detector 36 which is preferably a scintillation crystal type photon detector. Coupled to photon detector 36 is a photo-multiplier tube 38 which is utilized to convert the light energy created by incident photons on photon detector 36 to electrical energy which may be utilized to determine the number of photons thus detected. In a preferred embodiment of the present invention, a plurality of insulating blocks 40 are inserted into storage vessel 22 prior to sealing to further insulate photon detector 36. Insulating blocks 40 may be provided by utilizing an insulating material such as Marinite TM, manufactured by Johns Manville.

An important feature of the present invention is the manner in which low energy photons are transmitted from the formation surrounding sonde 12 to photon detector 36. As discussed above, aperture 16 acts in concert with plug 18 to permit low energy photons to enter sonde 12. Once within sonde 12, low energy photons must penetrate storage vessel 22 to strike photon detector 36. This is accomplished by utilizing a novel construction for both inner cylindrical shell 24 and outer cylindrical shell 26. Each cylindrical shell is formed of a low thermal conductive metallic material such as stainless steel or titanium. A band 42 within each cylindrical shell is formed of a low density material such as beryllium which permits low energy photons to pass through to photon detector 36.

Cylindrical shells 24 and 26 are preferably formed by bonding a band 42 of beryllium with stainless steel or titanium. Such bonding may be accomplished by brazing or by utilizing a hot extrusion press to form a transition joint at reference numeral 44. Thus, while storage vessel 22 provides thermal insulation for photon detector 36, a low density "window" is provided which permits low energy photons to enter and strike photon detector 36.

Those ordinarily skilled in the art will appreciate that while a single photon detector is depicted, the typical radioactivity logging device includes a plurality of photon detectors utilized in conjunction with a single photon source. Upon reference to the foregoing specification, those ordinarily skilled in the art will appreciate that a similar technique may be utilized to provide a low density "window" at various points within a Dewar flask to permit low energy photons to enter at several points and strike photon detectors. Additionally, multiple Dewar flasks may be utilized, each having a low density window through which low energy photons may enter.

Although the invention has been described with reference to a specific embodiment, this description is not meant to be construed in a limiting sense. Various modifications of the disclosed embodiment as well as alternative embodiments of the invention will become apparent to persons skilled in the art upon reference to the description of the invention. It is therefore contemplated that the appended claims will cover any such modifications or embodiments that fall within the true scope of the invention.

What is claimed is:

1. A well logging device suitable for insertion into a wellbore comprising:
   a sonde suitable for insertion into a wellbore;
   an insulated bimetallic storage vessel disposed within said sonde, said insulated bimetallic storage vessel comprising an inner shell including a continuous imperforate cylindrical wall and a radially spaced apart outer shell including a continuous imperforate cylindrical wall, each of the said cylindrical walls being constructed of a first metallic material and having a portion thereof constructed of a low density second metallic material having high photon transmission properties; and
   a photon detector disposed within said inner shell and surrounded by said low density second metallic material wherein photons pass through said low density second metallic material of the walls of the inner and outer shells to said photon detector.

2. The well logging device according to claim 1 wherein said sonde is constructed of a highly durable metallic material.

3. The well logging device according to claim 2 wherein said highly durable metallic material comprises tungsten.

4. The well logging device according to claim 2 wherein said sonde includes at least one aperture, said at least one aperture having a plug fitted therein, said plug comprising a low density material having high photon transmission properties.

5. The well logging device according to claim 4 wherein said aperture is disposed adjacent to said portion of said cylindrical wall of said outer shell constructed of said low density second metallic material having high photon transmission properties.

6. The well logging device according to claim 5 wherein said insulated bimetallic storage vessel includes means for sealing the volume between the cylindrical wall of said inner shell and the cylindrical wall of said outer shell.

7. The well logging device according to claim 6 wherein said volume between said cylindrical wall of said inner shell and said cylindrical wall of said outer wall is evacuated.

8. The well logging device according to claim 2 wherein said portion of said cylindrical wall of said outer shell constructed of said low density second metallic material having high photon transmission properties is aligned with and overlies said portion of said cylindrical wall of said inner shell constructed of said low density second metallic material having high photon transmission properties.

9. The well logging device according to claim 1 wherein said first metallic material comprises stainless steel.

10. The well logging device according to claim 1 wherein said first metallic material comprises titanium.

11. The well logging device according to claim 1 wherein said low density second metallic material having high photon transmission properties comprises beryllium.

12. The well logging device according to claim 1 wherein said photon detector comprises a scintillation crystal and an associated photo-multiplier tube.

* * * * *